A. R. McCAUSLAND.
SPEED CHANGING MECHANISM.
APPLICATION FILED APR. 2, 1909.
1,007,958.
Patented Nov. 7, 1911.
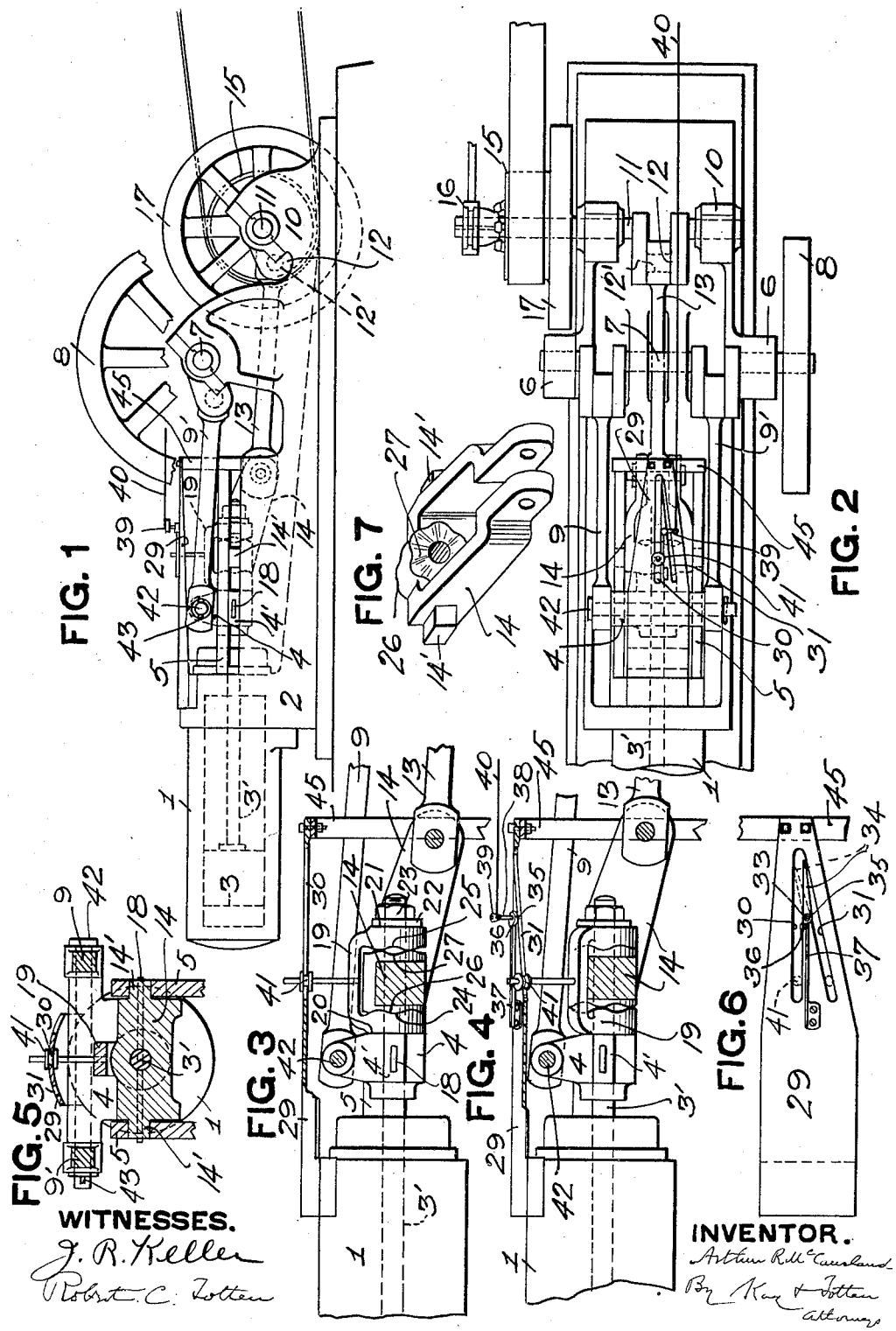

UNITED STATES PATENT OFFICE.

ARTHUR R. McCAUSLAND, OF WASHINGTON, PENNSYLVANIA.

SPEED-CHANGING MECHANISM.

1,007,958. Specification of Letters Patent. Patented Nov. 7, 1911.

Application filed April 2, 1909. Serial No. 487,528.

*To all whom it may concern:*

Be it known that I, ARTHUR R. MCCAUSLAND, a resident of Washington, in the county of Washington and State of Pennsylvania, have invented a new and useful Improvement in Speed-Changing Mechanism; and I do hereby declare the following to be a full, clear, and exact description thereof.

My invention relates to reversing mechanism for engines and has special application to heat and air engines, notably gas engines, where it is necessary to employ a suitable fly or balance wheel to insure the idle and compression strokes of the piston, and therefore, a matter of great difficulty to provide for the reversal of the stroke.

By my invention means are provided for the reversal of the engine while maintaining the revolution of the fly or balance wheel.

It consists, generally stated, in the employment of two independent shafts connected to the engine piston, one carrying the fly wheel and the other driving connections, with means for reversing the stroke of the latter, or power shaft, without reversing the stroke of the fly wheel shaft.

It also comprises certain specific improvements, as hereinafter set forth and claimed.

In the accompanying drawings Figure 1 is a side view illustrating my invention. Fig. 2 is a plan view, Fig. 3 is a detail view partly in section illustrating a novel feature of my invention. Fig. 4 is a perspective view similar to Fig. 3; and Fig. 5 is a vertical section on the line 5—5, Fig. 3. Fig. 6 is a vertical detail view; and Fig. 7 is a detail in perspective.

As the invention is illustrated in the drawing, any suitable engine is represented by the cylinder 1 attached to the bed frame 2. It has the piston 3 and the cross-head 4 moving in suitable guides 5. The showing of the engine is intended to be diagrammatic only and to represent any suitable type. Mounted in the bearing 6 of the bed frame is the fly wheel shaft 7 carrying the fly wheel 8, the shaft 7 being illustrated as a crank shaft connected by the double pitmen 9 and 9' to the cross-head 4 which is preferably journaled in an upwardly extending bearing in said cross-head. On a lower level than the shaft 7 is the bearing 10, in which is mounted the driven or power shaft 11, which is also illustrated as a crank shaft having the crank 12 pivoted at 12' to the connecting rod 13, which is also pivoted to the depending bifurcated arms 14 of the cross-head. The crank shaft is provided with suitable power connections, such, for example, as the driven wheel shown as a belt wheel 15 loosely mounted on said shaft, which is provided with the clutch 16 to connect the belt wheel with the shaft. The belt wheel is also shown provided with the fly wheel 17 fixed to its rim.

The cross-head 4 is of novel construction. It is joined to the piston rod 3' by the key 18, and has the lugs 4' sliding in the cross-head guides 5. The piston rod 3' extends through the cross-head proper 4, and has journaled thereon the yoke member 19 having the bearing face 20 bearing against the cross-head proper 4, and the bearing face 21, flush with the washer 22, which is held in place by the nut 23 screwed on the end of the piston rod. The inner faces 24 and 25 of the U-shaped yoke member 19 are of a curved or corrugated surface, as shown clearly in Figs. 3 and 4. These curved inner faces are in function cams which play on the corresponding faces 26 and 27 of the bifurcated depending arm 14, as illustrated in Figs. 3, 4 and 6. This arm 14 is fixed as regards rotation around the axis of the piston rod 3', as it is provided preferably with the tongues 14' sliding in the cross-head guides 5. Attached preferably to the engine cylinder 1 is the switch member 29 so situated as to extend horizontally just above the line of travel of the cross head 4. This member 29 is preferably braced by the bracket 45 fastened to the cross head guides 5. The member 29 is provided with the slot or guide 30 parallel to and preferably perpendicularly above the axis of the piston rod 3'. It has also the like slot 31 which converges at an acute angle with the slot 30 joining it at the end 32. Attached to the member 29 by the pivot 33 is the switch point 34 having the sleeve portion 35 provided with a finger 36 in engagement with the spring 37 also attached to the member 29. The switch point 34 has also the stud 38 at the pivot 33 having the lever arm 39 to which is attached the wire or cord 40, as shown clearly in (Fig. 2). Attached to the yoke member 19 is the pin 41 which is normally in register with the slot 30 of the member 29.

The shaft 7 to which is attached the fly wheel 8 has, as mentioned above, the dual pitmen 9 and 9' connecting it to the cross-head 4. These pitmen are journaled on the pivot 42 provided with the key 43, so that where, for a period, it is not desired to use the reversing mechanism, the pivot 42 may be withdrawn and the pitmen removed.

During normal operations the clutch 16 is set and the pin 41 travels in the slot 30 backward and forward at each complete stroke of the piston 3, being adjusted so as to travel in the forward stroke nearly to the end 32 of the slot 30. When it is desired to reverse the power connections or driven parts the clutch 16 is unset and the cord 40 is drawn so as to press the switch point 34 into the slot 30. The switch point 34 will be forced against this maintained pressure temporarily back into its normal position by the pin 41 on the forward stroke of the engine, until the pin passes the switch point, unless indeed, the pressure is exerted just at the instant of the extreme forward position. In either case the switch point 34 will, within the period of one full or double stroke, be forced across the slot 30 so that on the commencement of the return or backward stroke the pin 41 will be forced to travel along the converging slot 31. This will gradually turn the rotary yoke member 19, and therefore by the joint action of the cam bearing faces 24 and 26, and 25 and 27, on the yoke member 19 and on the depending arm 14 respectively, force the depending arm longitudinally of the piston rod 3′. This operation is clearly illustrated in Figs. 3 and 4 taken together; as the corrugated cam faces are so arranged and the slots 30 and 31 will be so adjusted as, when the back stroke of the piston is completed and, therefore, when the pin 41 has reached its extreme backward position in the slot 31, to force the depending arm 14 to its extreme forward position relative to the piston rod 3′, the cam faces being then at their extreme phase of juxtaposition. By this means the distance taken parallel to the axis of the piston rod 3′ between any given point on the crosshead proper 4 and the pivot 12′ is increased. That is to say, the crank 12 is kept farther away from the crosshead 4, or retarded in its stroke from its normal position therein. This results, therefore, in making impossible the passage of the connecting rod 13 past the dead center, or extreme backward phase of the piston stroke. The fly wheel 8 and its pitmen 9 and 9′ are entirely unaffected by this operation, however, and maintain the engine in its regular cycle of operation.

The connecting rod 13 and the power shaft 11 are therefore forced backward and their direction reversed. This is accomplished without great jar or tendency to wrench the machinery, as the fly wheel 17 together with the driven parts and the belt wheel 15 have already been loosened on the shaft 11, and the momentum of the connecting rod 13, the crank 12 and rotating shaft 11 alone remain to be overcome. As soon as the direction of the connecting rod 13 is reversed the clutch is immediately re-set and the pressure withdrawn from the cord 40, which allows the spring 37 to press the switch point 34 into its normal position as soon as the pin 41 has passed into its extreme forward position beyond the switch point 34. By this means the direction just obtained is automatically maintained. To reverse and obtain the original direction of rotation the operation is identical with that outlined above.

It will be noticed that a comparatively slight movement of the arm 14 relative to the normal position of the crosshead will result in stopping the crank 12 a comparatively much greater distance before it has reached its dead center, or horizontal position. This is because, as is well understood to those skilled in the art, a distance along a diameter of a circle extending to a point will result in a much greater distance along its circumference from the intersection of that diameter with the circumference to the intersection of a perpendicular from that point on the diameter to the circumference. For this reason likelihood of jamming the machinery is obviated.

My invention is particularly adapted to oil well and like machinery where the reversal of the driven parts is only occasionally required, and where it is sometimes desirable to disconnect the reversing mechanism entirely. This can be done as outlined above, in connection with the removable pitmen 9 and 9′. In this type of machinery the operator is frequently at a distance from the reversing mechanism, which contingency is provided for as outlined above. While particularly adapted to this type of machinery I regard my invention as broadly new and claim for it all uses to which it is applicable.

What I claim is:

1. In speed changing mechanism a reciprocating driving member, a power shaft, a driving connection between said shaft and said driving member, a driven wheel, and a clutch adapted to fix it to said shaft, and means for shortening said driving connection and thereby coöperating with said clutch to reverse said driven wheel.

2. In speed changing mechanism, an engine piston, two separate rotary shafts, two connecting rods pivotally connected to said piston and to each of said shafts respectively, one of said shafts being provided with a fly wheel and the other with a suitable power connection, and means coöperating therewith to reverse said power connection while maintaining the direction of rotation of said fly wheel.

3. In speed changing mechanism a driving member, a rotary driven member, a connection between said driving and driven members including a connecting rod and an arm pivoted to said rod and connected to said driving member, clutching means on said driven member, and means for varying the length of said connection to reverse the driven member.

4. In speed changing mechanism, in combination with an engine provided with a piston, crosshead and crosshead guides, a fly wheel and pitman connected to said crosshead, and a power shaft, a connection between said power shaft and said engine including a connecting rod and crank, and an arm pivoted to said connecting rod and connected to said crosshead, and mechanism for moving said arm longitudinally of said crosshead.

5. In speed changing mechanism, an engine provided with a piston and crosshead, in combination with a power shaft, a connecting rod connected thereto, and a fixed member provided with converging slots, said crosshead being provided with a rotatable yoke member having a collar provided with a cam face, said yoke member having a pin normally sliding in one of said slots, switching means adapted to direct said pin into the other of said slots and thereby partially rotate said yoke member, an arm pivoted to said connecting rod and provided with a cam portion in engagement with said cam face of said yoke member, whereby on the turning of the yoke member the said pivoted arm will be moved longitudinally of the crosshead.

6. In speed changing mechanism, an engine provided with a piston rod and crosshead, a crank and connecting rod connected to said power shaft, and a fixed member provided with two converging slots, one of which is parallel with the piston, said crosshead being provided with a yoke member journaled around said piston axis having two collars provided with curved corrugated inner cam faces, and with a pin normally sliding in register with said slot parallel to said piston axis, a switch and actuating means therefor adapted to direct said pin into the non-parallel slot and thereby partially rotate said yoke member, and a bifurcated arm pivoted to said connecting rod provided with corrugated cam faces engaging said cam faces of said yoke member whereby in the turning of the yoke member the said pivoted arm will be forced longitudinally of the crosshead.

7. In speed changing mechanism, an engine having a piston, a rotary shaft provided with a fly wheel and connected to said engine, a separate power shaft provided with a driven wheel journaled thereon, and a clutch adapted to fix it thereto, and mechanism connecting said power shaft and said engine, including a connecting rod and an arm pivoted thereto connected to the engine piston, and means for moving said arm longitudinally of said piston.

8. In speed changing mechanism, an engine, a rotary shaft provided with a fly wheel and connected to said engine, a separate power shaft provided with a driven wheel journaled thereon, and a clutch adapted to fix it thereto, and mechanism connecting said power shaft and said engine including a pivoted arm connected to the engine crosshead, and a fixed member rigid with the engine body, and turning means coöperating with said mentioned mechanism adapted to change the length of said connecting mechanism and reverse the engine stroke.

9. In speed changing mechanism, two separate shafts, one of which is provided with a fly wheel and the other with power connections, a driving member separately connected to both shafts, the connection to the power shaft including a member rotatable on the driving axis and having a cam face, and a member fixed relative to the driving axis and having a cam face in engagement with the aforesaid cam face.

10. In speed changing mechanism, a fixed member provided with connecting slots, a reciprocating member provided with a cam face and a member reciprocating identically with said reciprocating member provided with a cam face engaging with said cam face, and provided with means in engagement with said slots, whereby said cam faces are relatively moved.

11. In speed changing mechanism, a fixed member provided with connecting slots, a reciprocating driving member, a member reciprocating identically therewith and provided with means in engagement with said slots, a driven member, and means coöperating therewith to reverse said driven member.

12. In speed changing mechanism a reciprocating driving member, a driven shaft, a driving connection between said shaft and said driving member, means for lengthening said driving connection and thereby reversing its direction and the direction of the rotation of the driven shaft, and means for restoring the original length of driving connection at the next stroke of the piston and thereby maintaining the driven shaft in its reverse direction.

In testimony whereof, I the said ARTHUR R. McCAUSLAND have hereunto set my hand.

ARTHUR R. McCAUSLAND.

Witnesses:
J. F. DONEHOO,
J. C. BRYANT.